United States Patent Office 3,140,149
Patented July 7, 1964

3,140,149
PREPARATION OF PEROXY-HYDRATES
Valentin Habernickel, Dusseldorf, Germany, assignor to Henkel & Cie GmbH., Dusseldorf-Holthausen, Germany, a German corporation
No Drawing. Filed Jan. 16, 1957, Ser. No. 634,431
Claims priority, application Germany Jan. 20, 1956
9 Claims. (Cl. 23—14)

This invention relates to new and useful improvements in the preparation of peroxy-hydrate compounds. The invention more particularly relates to new and useful improvements in the preparation of inorganic peroxy compounds which contain water of crystallization.

Peroxy compounds which contain water of crystallization may be conventionally produced by concentrating or evaporating an aqueous solution which contains hydrogen peroxide and an inorganic salt to thereby precipitate a peroxy compound which contains water of crystallization. Generally the precipitation is brought about or at least favored in the presence of a considerable excess of hydrogen perioxide. This method is, therefore, relatively uneconomical and leads to large losses of hydrogen peroxide.

One object of this invention is a novel and more economical process for the production of inorganic hydrogen peroxide compounds which contain water of crystallization.

A further object of this invention is the production of novel inorganic peroxy compounds which contain water of crystallization and which are useful as washing, bleaching and penetrating agents and as detergent components. These and still further objects will become apparent from the following description:

Inorganic peroxy compounds which contain water of crystallization are prepared in accordance with the invention without the above mentioned disadvantages by contacting an inorganic salt which is able to bind water of crystallization with hydrogen peroxide and water in an inert diluent or dispersing agent in stoichiometric quantities corresponding to the peroxy compounds to be formed. The hydrogen peroxide and water are thus used only in such quantities as will add completely onto the inorganic salt so that, in general, the total quantity of the hydrogen peroxide and water together should not exceed the molar amount of water of crystallization which the inorganic salt can bind.

In place of the inorganic salt, hydrogen peroxide and water equivalent starting products may be used, as for example, materials which will form the inorganic salt hydrogen peroxide in water in situ.

In general the starting reactants are contacted with each other in stoichiometric quantity ratios which correspond to the general formula $$A \cdot xH_2O \cdot yH_2O_2$$

in which A is an inorganic salt which is able to bind a water of crystallization and $x$ and $y$ are multiples of one-half, the sum of $x$ and $y$ not exceeding the maximum number of mols of water of crystallization which the inorganic salt, represented by A, is able to bind.

The starting inorganic salts include all inorganic salts which are capable of forming compounds which contain water of crystallization. Of particular interest in this connection are salts of orthophosphoric acid, salts of phosphoric acids which contain less water than orthophosphoric acid, salts of carbonic acid, salts of silicic acid, salts of boric acid and salts of sulfuric acid. The salts are preferably in the form of alkali or alkali earth salts as the same are readily available in this form. Examples of suitable inorganic salts, therefore, include disodium phosphate, trisodium phosphate, sodium pyrophosphate, sodium metaphosphate, sodium tripolyphosphate or the corresponding potassium salts of these compounds. In addition, sodium or potassium metasilicate, sodium carbonate, magnesium carbonate, borax, sodium sulfate and similar salts may be used.

The inert organic diluents or dispersing agents in which the contacting is effected in accordance with the invention must be inert with respect to the reactants, must be resistant to hydrogen peroxide, and hydrogen peroxide and water should be relatively insoluble therein. The solubility of water should preferably not be more than 1% in the inert diluent or dispersing agent. Examples of inert organic diluents or dispersing agents which may be used in accordance with the invention include carbon tetrachloride, chloroform, decahydronaphthalene, benzene, toluene, xylene, benzine, hexachlorobenzene, chlorinated hydrocarbons, which contain 2 to 4 carbon atoms in the molecule, such as trichloroethane and tetrachlorethane and similar compounds. The inert organic diluents or dispersing agents are preferably readily volatile organic compounds such as chloroform, carbon tetrachloride, trichlorethane, tetrachlorethane or gasoline having a boiling point within the range of about 20 to 100° C. and preferably about 60° C., since these diluents permit a simple drying of the reaction product in the air. The diluents or dispersing agents with thus ordinary non-polar liquids should be preferably used in amounts of 2 to 12 parts by weight per part by weight of the inorganic salt.

The starting inorganic salt which, as mentioned, is preferably anhydrous or only partially contains water of crystallization may be dispersed in the inert organic diluent or dispersing agent and thereafter the hydrogen peroxide solution added.

Alternately it is possible to introduce the inorganic salt into a suspension of the hydrogen peroxide solution in the inert organic diluent with vigorous stirring or to simultaneously add the inorganic salt of a hydrogen peroxide solution to the diluent.

As mentioned, in place of the inorganic salt, the hydrogen peroxide and water, equivalent starting products of these components in the corresponding quantity ratios may also be reacted with each other. By equivalent starting products there are understood products which lead to exactly the same mixtures as are obtained when using the inorganic salts, the hydrogen peroxide and water, per se.

Thus, for example, instead of $Na_2CO_3$, $H_2O_2$ and $H_2O$, there may be used as starting components $Na_2O_2$, $CO_2$ and water. If, for example, it is desirable to obtain peroxy compounds of orthophosphoric acid which contain water of crystallization, instead of starting with trisodium phosphate, disodium phosphate, sodium hydroxide, water and hydrogen peroxide may be used. It is, furthermore, possible in this case to replace the sodium hydroxide and hydrogen peroxide with sodium peroxide in water. In the preparation of peroxy compounds of sodium sulfate it is possible, for example, to start from sulfuric acid, sodium peroxide and water instead of from $Na_2SO_4$, $H_2O$ and $H_2O_2$.

When using these equivalent starting products, quantity ratios should of course in all cases be so selected that exactly the same ratios are present as if an inorganic salt, water and hydrogen peroxide had been used as the starting products.

The contacting of the components in the presence of the inert diluent or dispersing agent is preferably effected at a temperature between about 0 to 55 and advantageously, between about 5 and 40° C. since it has been found that products which are obtained at temperatures above about 40° C. have a poorer stability than those obtained at a lower temperature.

The contacting results in the formation of a precipitate which is generally crystalline in nature and which may be separated from the reaction mixture and purified in an extremely simple manner.

The separation of the precipitate from the diluent may, for example, be effected by sharp suction, filtering, centriguging or the like. In many instances there are first of all obtained oily products which, however, after a period of time become crystalline in nature and which are advisedly separated only in such later state. The peroxy compound is obtained in this connection practically in an almost dry form. The last traces of the dispersing agent may be removed either by simple storage in air or under vacuum at room temperature. The diluent which has been separated may be repeatedly reused without any special treatment or purification.

If the inorganic peroxy compounds thus obtained, which contain water of crystallization, are carefully treated for a period of time, preferably at a slightly elevated temperature in a vacuum it is possible to remove one or more mols of water of crystallization particularly from the unused peroxy compounds which contain several mols of water of crystallization without any loss of the hydrogen peroxide content occurring.

The process, in accordance with the invention, allows the production of novel peroxy compounds or of peroxy compounds which could otherwise only be obtained by relatively uneconomical methods. The peroxy compounds obtained in accordance with the invention are excellently suited for industrial purposes even without further removal of water of crystallization as described above.

The peroxy compounds which contain water of crystallization produced, in accordance with the invention, may be characterized by the general formula $$A \cdot xH_2O \cdot yH_2O_2$$

in which A is an inorganic salt which is capable of binding water of crystallization and $x$ and $y$ are multiples of one half, the sum of $x$ and $y$ at a maximum not exceeding the maximum number of mols of water of crystallization which the inorganic salt, represented by A, is capable of binding.

As may be noted from the above, the sum of the number of mols of $H_2O_2+H_2O$ which the new perhydrate compound contains may, in each case, reach the same value as the maximum number of mols of water of crystallization which the inorganic salt is capable of binding or, of course, may be smaller.

Naturally, as in the case of the binding of water of crystallization by compounds, there is a preferred binding of a specific number of mols of $H_2O$ and $H_2O_2$ which frequently agrees with the prior experience as to the binding strength of different hydration stages of a given inorganic salt. In general, the peroxide compounds can be prepared in which the total number of mols of $$H_2O_2+H_2O$$

in the peroxy compound corresponds to the maximum number of mols of water of crystallization and at least to a preferred number which the inorganic salt in question is able to bind.

It is therefore possible, in principle, to obtain from compounds containing the maximum number of mols of $H_2O$ and $H_2O_2$ by a more or less careful dehydration of the desired lower hydration stages. However, numerous cases of several lower stages of hydration are known in connection with which the sum of $H_2O_2$ and $H_2O$ does not reach a maximum value and which are formed extremely rapidly upon the use of corresponding quantity ratios.

Examples of novel peroxy compounds which may be formed from salts of phosphoric acids in accordance with the invention include, by way of illustration and not limitation, $Na_3PO_4 \cdot 8H_2O \cdot 2H_2O_2$
$Na_3PO_4 \cdot 8H_2O \cdot H_2O_2$       $Na_2HPO_4 \cdot 8H_2O \cdot 1.5H_2O_2$
$Na_3PO_4 \cdot 6H_2O \cdot H_2O_2$       $Na_2HPO_4 \cdot 6H_2O \cdot 2H_2O_2$
$Na_3PO_4 \cdot 2H_2O \cdot 2H_2O_2$      $Na_2HPO_4 \cdot 5H_2O \cdot H_2O_2$
$Na_3PO_4 \cdot H_2O \cdot 2H_2O_2$       $Na_2HPO_4 \cdot 2H_2O \cdot H_2O_2$
$Na_3PO_4 \cdot 2H_2O \cdot H_2O_2$ $K_3PO_4 \cdot 2H_2O \cdot H_2O_2$        $Na_4P_2O_7 \cdot 8H_2O \cdot 2H_2O_2$
$K_2HPO_4 \cdot 5H_2O \cdot H_2O_2$       $Na_4P_2O_7 \cdot 3H_2O \cdot 2H_2O_2$
$K_2HPO_4 \cdot 2H_2O \cdot H_2O_2$       $Na_4P_2O_7 \cdot 2H_2O \cdot 2H_2O_2$
$(NaPO_3)_3 \cdot 2H_2O \cdot 2H_2O_2$    $K_4P_2O_7 \cdot 2H_2O \cdot H_2O_2$
$(NaPO_3)_3 \cdot 2H_2O \cdot H_2O_2$ Examples of novel peroxy compounds which may be formed in accordance with the invention from silicic acid salts and carbonates include, by way of illustration and not limitation:

$Na_2SiO_3 \cdot 3H_2O \cdot 2H_2O_2$     $Na_2CO_3 \cdot 9H_2O \cdot H_2O_2$
$Na_2SiO_3 \cdot 4H_2O \cdot H_2O_2$      $Na_2CO_3 \cdot 5H_2O \cdot 2H_2O_2$
$Na_2SiO_3 \cdot 2H_2O \cdot 2H_2O_2$     $NaCO_3 \cdot 3H_2O \cdot 2H_2O_2$ Further examples, given by way of illustration and not limitation, of novel peroxy compounds which may be formed in accordance with the invention include:

$Na_2B_4O_7 \cdot 5H_2O \cdot H_2O_2$     $Na_2B_4O_7 \cdot 3H_2O \cdot H_2O_2$
$Na_2SO_4 \cdot 6H_2O \cdot H_2O_2$  and  $MgCO_3 \cdot 4H_2O \cdot H_2O_2$ Of particular technical interest is sodium tripolyphosphate peroxypentahydrate ($Na_5P_3O_{10} \cdot 5H_2O \cdot H_2O_2$). This compound simultaneously possesses particularly good water-softening, bleaching and cleaning properties.

The peroxy compounds containing water of crystallization which can be prepared in accordance with the above described method can be used in all cases in which the initial components of which they are constructed can be employed. In particular there enters into question in this connection use in or as rinsing, washing, bleaching and penetrating agent as well as, in a few cases, as for example in the case of the peroxy compounds, which are derived from phosphoric acid, simultaneous use for the softening of water. The new perhydrates in this connection have the advantage of a simple method of production without loss of hydrogen peroxide over the previously known perhydrate compounds. Furthermore, in many cases when using the new peroxy compounds in media having bleaching properties, it is no longer necessary to introduce therein components which basically serve only as vehicle for the hydrogen peroxide, in connection with which, however, the vehicle component per se could be dispensed with. This case exists for instance when perborate is employed. In such cases, the $H_2O_2$ can, as desired, be bound to a phosphate, soda, silicate or even sodium sulfate, and therefore practically to any important inorganic component of a washing, laundry, bleaching or penetrating agent and, depending on the purpose and the requirements, there may be employed the peroxy compound of the particular inorganic salt or salts desired.

In addition to this, it has been found that the new peroxy compounds and, in particular, those which in general have a relatively higher content of water of crystallization than the previously known perhydrates are in no way inferior to the latter with respect to their stability and, when mixed with other substances, are in general more stable, especially as the less hydrated peroxy compounds tend more easily to take up water. Furthermore, when using the previously known perhydrates, the same easily give rise to the binding together of the washing and bleaching agent, provided additional measures are not taken.

The new peroxy compounds, even without the addition of a stabilizing agent, are of high stability. By the addition of small quantities of a stabilizing agent of about 0.05 to 5%, and preferably 0.1 to 2% by weight, a practically unlimited stability is obtained. As stabilizer there can be used in this connection compounds such as tetrasodium pyrophosphate, potassium pyrophosphate, sodium silicate, potassium silicate, $SnCl_2$ and preferably magnesium silicate or mixtures thereof, such as a mixture of sodium silicate and magnesium silicate.

Organic compounds may also enter into question as stabilizer, as for instance orthooxyquinoline or pyridine carboxylic acids, such as trimesitic acids, nicotinic acid, etc. The $H_2O_2$ loss of the products stabilized in this manner does not in general amount to more than 0.3% over the course of about a year, as has been shown by experiments. As already stated, the new peroxides can find use in particular in cleansing agents, laundry agents, washing, bleaching and penetrating agents, and in certain cases simultaneously as water softening agent, as, for instance, in the case of $Na_5P_3O_{10} \cdot 5H_2O \cdot H_2O_2$. The quantity of the new perhydrate compounds in the said agents can vary within wide limits, particularly as a function of the bleaching effect desired. In washing and cleaning agents, generally a quantity of about 5 to 50% and preferably 10 to 30% by weight perhydrate compound referred to the total composition is employed.

In such washing and cleaning agents, there can be employed as surface active substances the customary known compounds such as alkyl benzene sulfonates, alkyl sulfates and fatty alcohol sulfates having 10 to 20 carbon atoms in the molecule and the condensation products of ethylene oxide with fatty acids, fatty alcohols and phenols which contain 4 to 25 ethylene oxide groups in the molecule.

Soap or mixtures of soap with the above indicated synthetic surface active substances can also be employed. The quantity of surface active substances used is generally 5 to 80% by weight referred to the total composition.

The washing agents (detergents) can also contain neutral salts, such as sodium sulfate or magnesium sulfate or compounds such as sodium carbonate, sodium bicarbonate and di- or trisodium phosphates. The washing and cleaning agents may preferably also contain anhydric phosphates which are derived from phosphoric acids which contain less water than ortho-phosphoric acid. Such phosphates are, for instance, pyrophosphates or polyphosphates of the composition $Na_5P_3O_{10}$ or $Na_6P_4O_{13}$ as well as metaphosphates such as hexametaphosphate. The anhydric phosphates can preferably be present in quantities of 5 to 50% by weight, referred to the total composition. Furthermore, the washing agents can also contain dyes and optical brighteners (for instance 0.1 to 2% of the total composition) and preferably also stabilizers for the per-compounds as already described above.

The following examples are given by way of illustration and not limitation:

*Example 1*

368 parts by weight sodium tripolyphosphate (anhydrous) are dispersed in 3 times the quantity by weight of $CCl_4$, and 124 parts by weight of an $H_2O_2$ solution containing per every 5 mols of $H_2O$ one mol $H_2O_2$ are added at room temperature with strong agitation. The pulverulent tripolyphosphate suspended in the diluent immediately reacts to form the crystalline sodium tripolyphosphate perhydrate. After a short time the crystalline mass is sharply separated from the diluent and dried either in air or in vacuum. There are obtained about 490 grams of sodium tripolyphosphate peroxy pentahydrate $$(Na_5P_3O_{10} \cdot H_2O_2 \cdot 5H_2O)$$

with 6.90–6.91% $H_2O$.

Substantially the same results are obtained when, instead of 3 times the quantity by weight of carbon tetrachloride, 4 times the quantity by weight of chloroform is used as dispersing agent.

*Example 2*

82 parts of a detergent composition, prepared by hot spraying and containing 16% pyrophosphate, 40% sodium sulfate, 10% waterglass (mol ratio $SiO_2:Na_2O=3.5:1$), 0.3% magnesium silicate and 18% fatty alcohol sulfate (balance water) are mixed with 18 parts of sodium tripolyphosphate peroxy pentahydrate $(Na_5P_3O_{10} \cdot H_2O_2 \cdot 5H_2O)$. The composition obtained in this manner after dissolving in water (about 10 grams per liter) is an excellent detergent. The washing power of this composition is greater than that of the identical detergent which, however, contains perborate as pherhydrate compound rather than sodium tripolyphosphate peroxy pentahydrate. Practically the same result is obtained when 0.1% orthooxyquinoline is used instead of magnesium silicate.

*Example 3*

99.5 parts sodium tripolyphosphate-peroxy-pentahydrate and 0.5 part magnesium silicate are mixed. The composition prepared in this manner when dissolved in water (about 10 grams per liter) gives an excellent bleaching agent.

Practically the same result is obtained when 0.1 nicotinic acid is used instead of the magnesium silicate.

*Example 4*

A penetration and washing agent having very good cleaning properties is obtained with 12 grams of a mixture of 97% tripolyphosphate-peroxypentahydrate, 1.5% water glass, 0.5% magnesium silicate and 1% fatty alcohol sulfate dissolved in 1000 grams of water.

*Example 5*

164 parts by weight of anhydrous trisodium orthophosphate are suspended in four times their quantity by weight of chloroform. Thereupon while agitating, there are slowly added to the suspension over the course of 40 minutes at a temperature of about 15 to 20° C. 212 parts by weight of an $H_2O_2$ solution which contains 2 mols of $H_2O_2$ for every 8 mols of $H_2O$, the stirring being continued for a short time. After a few minutes, the peroxide formed deposits. (The same result is obtained if one starts using the same procedure, with 200 parts by weight $Na_3PO_4 \cdot 2H_2O$ and adds 176 parts by weight of an $H_2O_2$ solution which contains 2 mols of $H_2O_2$ per 6 mols of $H_2O$.) Thereupon the crystalline reaction product, the composition of which corresponds to the formula $Na_3PO_4 \cdot 8H_2O \cdot 2H_2O_2$, is separated from the dispersing agent by filtration and any traces of the dispersing agent possibly still adhering are removed by drying the reaction product in air. There are obtained about 374 parts $Na_3PO_4 \cdot 8H_2O \cdot 2H_2O_2$, containing 18.6% $H_2O_2$.

*Example 6*

In the same manner as in Example 5 using the quantities of trisodium phosphate or disodium phosphate and of the corresponding potassium salts set forth in detail below, there are obtained new crystalline orthophosphate perhydrates of the composition given below. The quantities of $H_2O$ and $H_2O_2$ used in this connection are in each case, as in the case of Example 5, added in the form of an aqueous hydrogen peroxide solution. If desired, it is possible to also replace the phosphates which are free of water of crystallization as indicated below in detail in each case by phosphates which partially contain water of crystallization. The reaction takes place practically quantitatively in all cases.

There are obtained:

(1) $Na_3PO_4 \cdot 8H_2O \cdot H_2O_2$ ($H_2O_2$ content: 9.9%) from $Na_3PO_4$, $H_2O$ and $H_2O_2$ in a mol ratio of 1:8:1 or from $Na_3PO_4 \cdot 2H_2O$, $H_2O$, $H_2O_2$ in a mol ratio of 1:6:1.

(2) $Na_3PO_4 \cdot 6H_2O \cdot H_2O_2$ ($H_2O_2$ content: 11.1%) from $Na_3PO_4$, $H_2O$ and $H_2O_2$ in a mol ratio of 1:6:1 or from $Na_3PO_4 \cdot 2H_2O$, $H_2O$, $H_2O_2$ in a mol ratio of 1:4:1.

(3) $Na_3PO_4 \cdot 2H_2O \cdot 2H_2O_2$ ($H_2O_2$ content: 25.6%) from $Na_3PO_4$, $H_2O$ and $H_2O_2$ in a mol ratio of 1:2:2.
(4) $Na_3PO_4 \cdot H_2O \cdot 2H_2O_2$ ($H_2O_2$ content: 27.4%) from $Na_3PO_4$, $H_2O$ and $H_2O_2$ in a mol ratio of 1:1:2.
(5) $Na_2HPO_4 \cdot 8H_2O \cdot 1.5H_2O_2$ ($H_2O_2$ content: 15%) from $Na_2HPO_4$, $H_2O$ and $H_2O_2$ in a mol ratio of 1:8:1.5.
(6) $Na_2HPO_4 \cdot 6H_2O \cdot 2H_2O_2$ ($H_2O_2$ content: 21%) from $Na_2HPO_4$, $H_2O$ and $H_2O_2$ in a mol ratio of 1:6:2.
(7) $Na_2HPO_4 \cdot 5H_2O \cdot H_2O_2$ ($H_2O_2$ content: 12.5%) from $Na_2HPO_4$, $H_2O$ and $H_2O_2$ in a mol ratio of 1:5:1.
(8) $Na_2HPO_4 \cdot 2H_2O \cdot 2H_2O_2$ ($H_2O_2$ content: 27.8%) from $Na_2HPO_4$, $H_2O$ and $H_2O_2$ in a mol ratio of 1:2:2.
(9) $K_3PO_4 \cdot 2H_2O \cdot H_2O_2$ ($H_2O_2$ content: 12%) from $K_3PO_4$, $H_2O$ and $H_2O_2$ in a mol ratio of 1:2:1.
(10) $K_2HPO_4 \cdot 5H_2O \cdot H_2O_2$ ($H_2O_2$ content: 11.4%) from $K_2HPO_4$, $H_2O$ and $H_2O_2$ in a mol ratio of 1:5:1.
(11) $K_2HPO_4 \cdot 2H_2O \cdot H_2O_2$ ($H_2O_2$ content: 13.9%) from $K_2HPO_4$, $H_2O$ and $H_2O_2$ in a mol ratio of 1:2:1.

*Example 7*

The same results are obtained in all the examples indicated when instead of chloroform the same quantity of carbon tetrachloride is used as dispersing agent.

376 grams of $Na_3PO_4 \cdot 8H_2O \cdot 1H_2O_2$, which have been prepared as described in Example 6 are treated for about 1 hour at about 35 to 40° C. in vacuum at a pressure of 25 mm. Hg. During this treatment, 6 mols of water of crystallization are withdrawn from the product so that as final product there are obtained about 268 grams of the compound $Na_3PO_4 \cdot 2H_2O \cdot 1H_2O_2$ containing 14.6% hydrogen peroxide.

*Example 8*

To a suspension of 178 parts of disodium phosphate dihydrate and 40 parts of pulverized caustic soda in 400 parts of chloroform, there are added over the course of 1 hour at 10° C. 124 parts of an $H_2O_2$ solution containing 27.5% $H_2O_2$. The trisodium phosphate octahydrate-monoperhydrate formed which contains 9.9% $H_2O_2$ is separated by centrifuging and dried in air. Yield 340 grams.

*Example 9*

533 parts of anhydrous pyrophosphate are dispersed in 2000 parts of trichlorethane and 392 parts of 34.7% $H_2O_2$ are added to the mixture at 25°. Stirring is continued until the originally oily layer on the trichlorethane has passed into a crystalline product. Thereupon it is separated from the dispersing agent and the residue dried in air. There are obtained about 925 parts pyrophosphate perhydrate containing 14.2% $H_2O_2$ corresponding to the compound: $Na_4P_2O_7 \cdot 8H_2O \cdot 2H_2O_2$.

The same result is obtained when, other conditions being the same, the anhydrous pyrophosphate is replaced by 604 grams $Na_4P_2O_7 \cdot 2H_2O$ as well as 324 grams $H_2O_2$ solution, containing 2 mols of $H_2O_2$ to 6 mols of $H_2O$.

If, with the same manner of procedure as indicated in above there are used as starting product 533 parts by weight anhydrous pyrophosphate and 232 parts by weight 58% $H_2O_2$, there is obtained a perhydrate containing water of crystallization corresponding to the formula $Na_4P_2O_7 \cdot 3H_2O \cdot 2H_2O_2$. The hydrogen peroxide content of this compound is 17.5%.

If 533 parts by weight of anhydrous pyrophosphate and 208 parts by weight of 66% $H_2O_2$ are reacted with each other under the same operating conditions as set forth above, the compound $Na_4P_2O_7 \cdot 2H_2O \cdot 2H_2O_2$ is obtained. The hydrogen peroxide content of this compound is 18.4%.

The same compound is obtained when the perhydrate of the formula $Na_4P_2O_7 \cdot 8H_2O \cdot 2H_2O_2$ described above is treated in vacuum at about 60° C. and at a pressure of 35 mm. Hg for some time. In this treatment 6 mols of water of crystallization are withdrawn from the initial product.

The compound $K_4P_2O_7 \cdot 2H_2O \cdot H_2O_2$ ($H_2O_2$ content: 8.5%) is obtained, using the same manner of procedure as indicated above, with 330 parts by weight anhydrous potassium phosphate and 70 parts by weight of 49% $H_2O_2$ solution.

In all cases indicated the reaction takes place with practically 100% yield.

*Example 10*

300 parts by weight trimetaphosphate free of water of crystallization are dispersed in 700 parts by weight of $CCl_4$. Thereupon 70 parts by weight of a 48.5% hydrogen peroxide solution are slowly added, the stirring being continued for some time. The temperature during the reaction is 15 to 20° C. Thereupon the perhydrate formed, which corresponds to the formula $$(NaPO_3)_3 \cdot 2H_2O \cdot H_2O_2$$

is filtered off and freed from adherent diluent by drying in air. The hydrogen peroxide content of the compound obtained in this manner is 9.2%

The manner of procedure remaining the same, there are obtained from 306 parts by weight of trimetaphosphate (anhydrous) and 104 parts by weight of 66% $H_2O_2$ solution a crystalline perhydrate which corresponds to the formula $(NaPO_3)_3 \cdot 2H_2O \cdot 2H_2O_2$ and the $H_2O_2$ content of which is 16.5%. The yield in both cases is practically 100%.

*Example 11*

140 parts by weight sodium metasilicate monohydrate which has been previously finely pulverized are dispersed in 1000 parts by weight of chloroform. To this dispersion 88 parts by weight of 38.6% $H_2O_2$ are slowly added at temperatures between 30 and 40° C. while stirring. The batch is then allowed to stand for a short time until the perhydrate has completely separated out in crystalline form and it is then separated by filtration from the dispersing agent. After drying for a short time in vacuum, there are obtained approximately 230 parts by weight of a metasilicate perhydrate corresponding to the formula $Na_2SiO_3 \cdot 4H_2O \cdot H_2O_2$. The hydrogen peroxide content of this compound is 14.7%.

Operating in the same manner as indicated above, there are obtained from 140 parts by weight metasilicate monohydrate and 86 parts by weight 79% $H_2O_2$ a perhydrate which corresponds to the formula $Na_2SiO_3 \cdot 2H_2O \cdot 2H_2O_2$. The $H_2O_2$ content of this compound is 30%.

If, with the same method of operation as above, there are used as starting product 140 parts by weight metasilicate-monohydrate and 104 parts by weight 66% $H_2O_2$ solution, there is obtained as perhydrate a compound which corresponds to the formula $Na_2SiO_3 \cdot 3H_2O \cdot 2H_2O_2$. The $H_2O_2$ content of this compound is 27.8%.

The reaction takes place in all three cases with practically a 100% yield.

*Example 12*

106 parts by weight sodium carbonate (anhydrous) are dispersed in 600 parts by weight of $CCl_4$ or 750 parts by weight of chloroform and 196 parts by weight of 17.4% $H_2O_2$ solution are slowly added at a temperature of about 10° C. Stirring is effected during the addition of the $H_2O_2$ solution and continued for a time. After about 1 hour, the perhydrate has deposited as a crystalline substance which corresponds to the formula $$Na_2CO_3 \cdot 9H_2O \cdot H_2O_2$$

($H_2O_2$ content: 11.25%) and is filtered off and dried in the air.

The same compound is obtained, under the same operating conditions, when 232 parts by weight of $$Na_2CO_3 \cdot 7H_2O$$

and 70 parts by weight 50% $H_2O_2$ solution are used as starting components.

If to a suspension of 200 parts by weight of carbontetrachloride and 106 parts by weight $Na_2CO_3$ (anhydrous) there are slowly added with stirring at a temperature of about 10° C., 122 parts by weight of 56% $H_2O_2$ solution, there is obtained at the start an oily product which however after about two hours passes into a solid perhydrate compound. This is separated by filtration and corresponds to the composition $$Na_2CO_3 \cdot 3H_2O_2 \cdot H_2O$$

($H_2O_2$ content 29.7%). The yield is approximately 230 parts by weight.

With the same manner of operation as in the preceding section, there are obtained from 106 parts by weight $Na_2CO_3$ (anhydrous) and 158 parts by weight of 43% $H_2O_2$ solution, the compound $Na_2CO_3 \cdot 5H_2O \cdot 2H_2O_2$ in practically a 100% yield. The $H_2O_2$ content of this compound is 25.8%.

*Example 13*

180 parts of water are mixed with 450 parts of chloroform, the mixture is cooled to −10° C., stirred with 78 parts ground $Na_2O_2$, and as soon as an oily homogeneous layer has separated out on the dispersing agent, $CO_2$ is introduced at 0 to 5° C. with strong agitation until the oily layer just begins to pass into a crystalline product. Stirring is continued for ½ hour at room temperature whereupon the product is suction-filtered from the dispersing agent and dried in air. There are obtained about 300 parts soda-perhydrate-9-hydrate containing 11.25% $H_2O_2$.

*Example 14*

To a suspension of 402 parts by weight borax (anhydrous) in about 5000 parts by weight of carbontetrachloride there are added 248 parts by weight of a 24.4% $H_2O_2$ solution. The addition is effected at a temperature of 25 to 30° C. with agitation. The batch is then set aside for about two hours, stirred thoroughly from time to time and cooled in this connection to about 0° C. for the better separation of the crystalline perhydrate. Thereupon the perhydrate formed, which corresponds to the formula $Na_2B_4O_7 \cdot 5H_2O \cdot H_2O_2$ is separated by filtration from the dispersing agent. The yield is 650 grams; the $H_2O_2$ content of the compound obtained in this manner is 10.5%.

If, the manner of procedure remaining the same, there is used as starting components 402 parts by weight borax (anhydrous) and 88 parts by weight of a 40% $H_2O_2$ solution, there is obtained a practically 100% yield of a perhydrate of the composition $Na_2B_4O_7 \cdot 3H_2O \cdot H_2O_2$. The $H_2O_2$ content of this compound is 11.7%.

*Example 15*

142 parts by weight sodium sulfate (anhydrous) are dispersed in 600 parts by weight of benzene and 142 parts by weight of a 24% $H_2O_2$ solution are slowly added while stirring at temperatures of about 10° C. The batch is then allowed to stand for a short time and the perhydrate which forms is removed by centrifuging from the dispersing agent. There are obtained 282 grams of a perhydrate having the composition $Na_2SO_4 \cdot 6H_2O \cdot H_2O_2$. The hydrogen peroxide content of this compound is 12%.

*Example 16*

78 parts of ground sodium peroxide are dispersed in 500 parts $CCl_4$, the suspension is cooled to 0° C. and 206 parts by weight of 47.5% sulfuric acid are slowly added. After about one hour, the sodium sulfate hexahydrate monoperhydrate containing 12% $H_2O_2$ has separated in the form of a crystalline substance which is removed by centrifuging and thereupon dried.

*Example 17*

84 parts by weight of anhydrous magnesium carbonate are dispersed in 4 times the quantity by weight of gasoline (boiling point about 50–90° C.) and 106 parts by weight of 33% $H_2O_2$ solution are slowly added at a temperature of about 20° C. After a short time a solid perhydrate compound separates out corresponding to the formula $MgCO_3 \cdot 4H_2O \cdot H_2O_2$ and is removed by filtration from the dispersing agent. The yield of this compound is 190 grams, the $H_2O_2$ content 17.8%.

*Example 18*

A penetration and washing agent having excellent properties is obtained by preparing a mixture of 98% by weight $Na_4P_2O_7 \cdot 3H_2O \cdot 2H_2O_2$, 1% by weight waterglass, 0.1% ortho-oxyquinoline and 0.9% fatty alcohol sulfonate and dissolving it in water, 10 grams of the mixture being used per liter of water.

*Example 19*

For the cleaning and disinfection of foodstuff containers, such as bottles and milk cans, there is excellently suited a product of the following composition:

20% by weight alkali silicate (mol ratio
  $SiO_2:Na_2O=3.5:1$)
5% by weight fatty alcohol sulfonate
20% by weight sodium tripolyphosphate
55% by weight of a trisodium phosphate perhydrate of the formula $Na_3PO_4 \cdot 8H_2O \cdot H_2O_2$ Substantially the same results are obtained if instead of $Na_3PO_4 \cdot 8H_2O \cdot H_2O_2$, the corresponding quantity $$Na_3PO_4 \cdot 6H_2O \cdot H_2O_2$$

or $Na_3PO_4 \cdot 2H_2O \cdot H_2O$ is used.

*Example 20*

As mild washing agent for the gentle treatment of silk, rayon fibers and the like at reduced temperatures, there is well suited a product having the following composition:

23% by weight $C_{12}$ fatty alcohol sulfonate
14% by weight $C_{12}$ alkyl benzenesulfonate
10% by weight sodium tripolyphosphate
3% by weight magnesium silicate
30% by weight sodium sulfate
2% by weight optical brightener, foam stabilizers, fiber protective agents and dyestuffs
18% by weight of a disodium phosphate perhydrate of the formula $Na_2HPO_4 \cdot 8H_2O \cdot 1.5H_2O$ Substantially the same result is obtained if instead of $Na_2HPO_4 \cdot 8H_2O \cdot 1.5H_2O$ there is employed the corresponding quantity of a mixture of equal parts of $$Na_2HPO_4 \cdot 6H_2O \cdot 2H_2O_2$$

and $Na_2HPO_4 \cdot 2H_2O \cdot H_2O_2$.

*Example 21*

An excellent boil-washing agent of strong alkaline reaction (pH 10.5) is obtained by preparing a 1% aqueous solution of a mixture of the following composition:

7% by weight fatty alcohol sulfonate
7% by weight alkyl benzenesulfonate
22% by weight sodium pyrophosphate
10% by weight tripolyphosphate
6% by weight waterglass (mol ratio:
  $SiO_2:Na_2O=3.3:1$)
10% by weight sodium sulfate
15% by weight of a soda-perhydrate of the formula
  $Na_2CO_3 \cdot 5H_2O \cdot 2H_2O_2$
Balance water A washing agent of similar quality is obtained if in the above indicated combination the waterglass and soda perhydrate are replaced by 7% by weight $$Na_2SiO_2 \cdot 2H_2O \cdot 2H_2O_2$$

and 14% by weight $Na_2CO_3 \cdot 9H_2O \cdot H_2O_2$.

Example 22

A powder obtained by the hot spraying of an aqueous pasty washing agent preparation of the composition:

20% by weight fatty alcohol sulfonate
15% by weight alkyl benzenesulfonate
30% by weight sodium pyrophosphate
15% by weight alkali silicate (mol ratio $SiO_2:Na_2O=3.3:1$)
5% by weight magnesium silicate 15% by weight sodium sulfate is mixed with 20% of a metaphosphate-perhydrate of the composition $(NaPO_3)_3 \cdot 2H_2O \cdot H_2O_2$, which was prepared in the manner described in Example 10. There is obtained an excellent washing agent, in which connection the metaphosphate perhydrate used is hydrated in the washing liquor and passes into tripolyphosphate which thus only gradually develops its cleaning-and-washing-power with increasing action.

I claim:

1. Method for the preparation of perhydrate compounds containing water of crystallization which comprises reacting an inorganic salt capable of binding water of crystallization and selected from the group consisting of phosphates, silicates, carbonates, borates and sulphates of a metal selected from the group consisting of sodium, potassium and magnesium with hydrogen peroxide and water in a peroxide-resistant, substantially water- and peroxide-immiscible, oxygen-free organic liquid, non-reactive with respect to said reactants, and having a boiling point of at most 100° C., said hydrogen peroxide and said water each being present in molar amounts equal to multiples of one half mol and in which the total of the molar amounts of said peroxide and water does not exceed the maximum number of mols of water of crystallization which said inorganic salt is capable of binding and recovering the perhydrate compound formed.

2. Method according to claim 1 in which said inorganic salt is a salt in a lower hydration state than complete hydration.

3. Method according to claim 1 in which said organic liquid is present in amount of about 2 to 12 parts by weight per part by weight of said inorganic salt.

4. Method according to claim 1 in which said reacting is effected at a temperature between about 0 and 55° C.

5. Method according to claim 1 in which said salt is sodium tripolyphosphate and in which said reacting is effected with a molar ratio of sodium tripolyphosphate and hydrogen peroxide and water of 1:1:5.

6. Method according to claim 1 which includes removing a portion of the water of crystallization from said recovered perhydrate compound.

7. Method according to claim 1 in which at least one of said inorganic salt and said hydrogen peroxide is formed in situ.

8. Method according to claim 1 in which said organic liquid is selected from the group consisting of chloroform, carbontetrachloride, trichlorethane, tetrachlorethane, benzene and gasoline having a boiling point of less than 100°C.

9. Method according to claim 1 in which said inorganic salt is salt of phosphoric acid containing less water in its molecule than orthophosphoric acid.

References Cited in the file of this patent
UNITED STATES PATENTS

| | | |
|---|---|---|
| 1,914,312 | Vieweg et al. | June 13, 1933 |
| 2,012,462 | Agthe | Aug. 27, 1935 |
| 2,141,189 | Lind | Dec. 27, 1938 |
| 2,371,545 | Riggs et al. | Mar. 13, 1945 |
| 2,556,953 | Young | June 12, 1951 |
| 2,576,205 | Apperson | Nov. 27, 1951 |
| 2,740,689 | Easton et al. | Apr. 3, 1956 |